Patented Oct. 17, 1922.

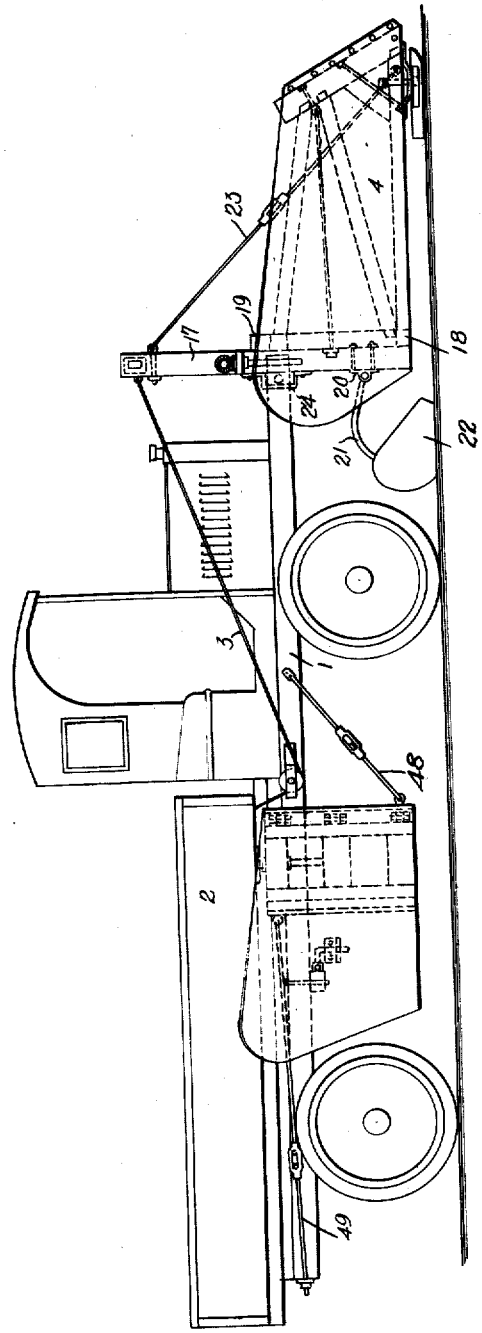

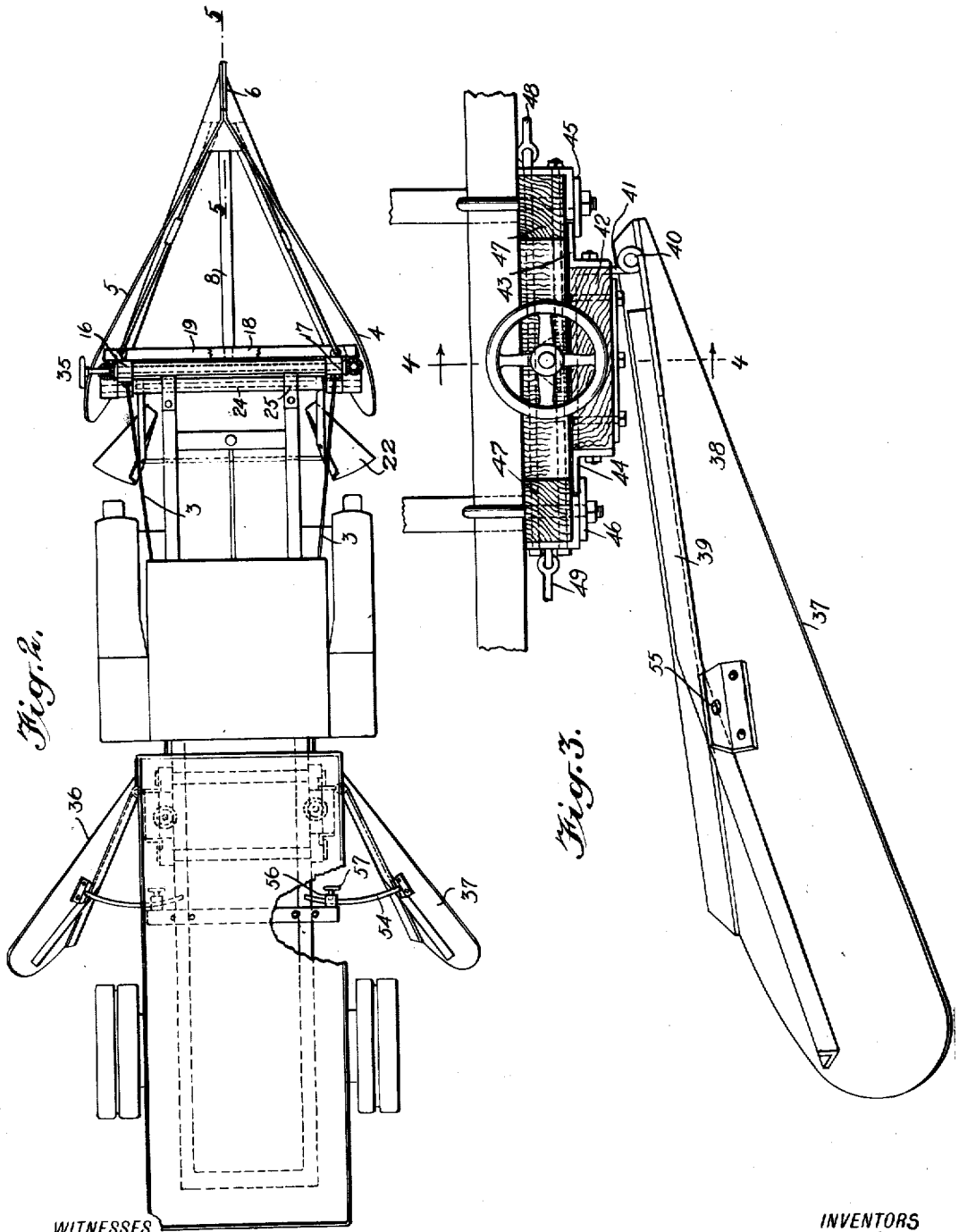

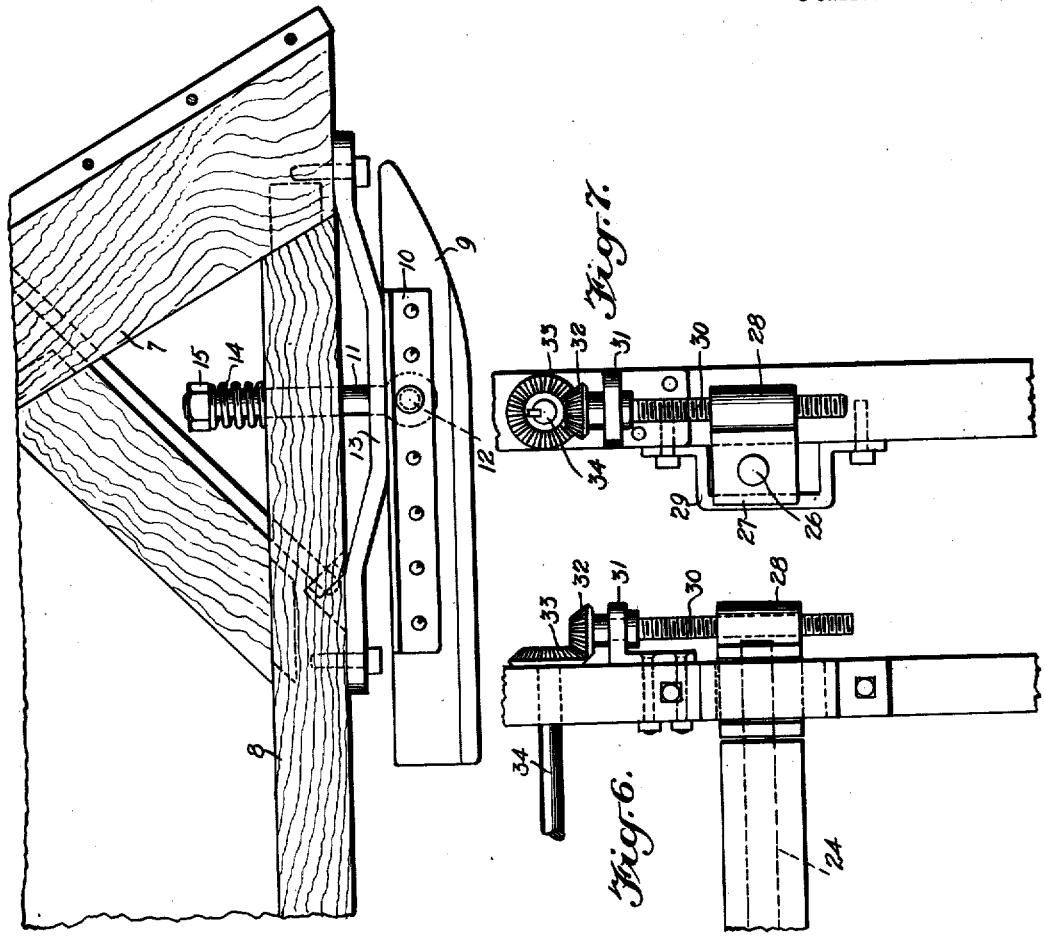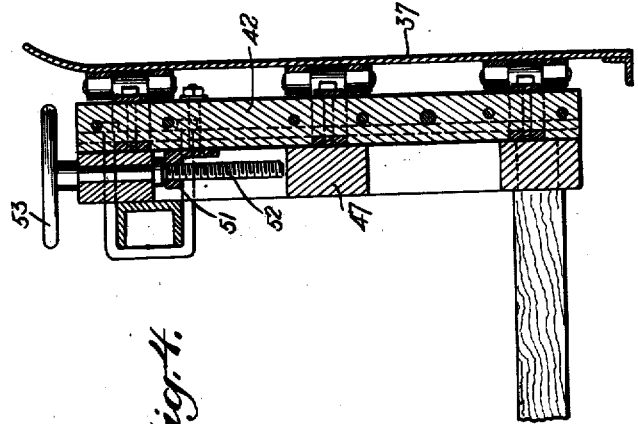

1,432,377

UNITED STATES PATENT OFFICE.

LUCIUS EDWIN ADAMS AND CHARLES CLYDE PECK, OF MUNISING, MICHIGAN.

SNOWPLOW.

Application filed May 14, 1921. Serial No. 469,733.

*To all whom it may concern:*

Be it known that we, LUCIUS E. ADAMS and CHARLES C. PECK, both citizens of the United States, and residents of Munising, in the county of Alger and State of Michigan, have invented a new and Improved Snowplow, of which the following is a full, clear, and exact description.

This invention relates to snow plows and has for an object to provide an improved construction which may be applied to trucks, tractors or any suitable motor vehicle.

Another object in view is to provide a snow plow structure which may be connected to a motor vehicle and arranged and supported principally by traction members engaging the ground while connected to the vehicle in such a manner as to be pushed readily along.

A still further object of the invention is to provide an improved snow plow structure which includes a V-shaped plow member attachable to the front of the vehicle, auxiliary plow members or rutters arranged in front of the wheels of the vehicle and deflecting wings arranged in back of the V-shaped plow structure whereby a comparatively wide swath is cleaned at one operation.

In the accompanying drawings—

Figure 1 is a side view of a truck with an embodiment of the invention applied thereto.

Figure 2 is a top plan view of the structure shown in Figure 1.

Figure 3 is a top plan view of one of the side wings and actuating members therefor.

Figure 4 is a sectional view through Figure 3 on line 4—4.

Figure 5 is an enlarged detail sectional view through Figure 2 on line 5—5.

Figure 6 is an enlarged fragmentary rear view of one of the elevating screws and associated parts embodying certain features of the invention.

Figure 7 is an edge view of the structure shown in Figure 6.

Referring to the accompanying drawings by numeral, 1 indicates a motor vehicle or truck of any desired kind to which the various parts of the plow are connected. The truck shown in the drawing is provided with a box 2 which is associated with a hoist or elevating mechanism whereby the box may be dumped. When a truck of this kind is not used a windlass or some other structure must be used for holding and drawing in on the cables 3 which cables are used to brace and also tilt the front plow.

As shown in Figures 1 and 2 the front plow is provided with moldboards 4 and 5 which are twisted somewhat to give the desired throw to the snow, said moldboards being connected together at 6 for forming substantially a V-shaped structure. Suitable bracing member 7 are used for bracing the moldboards, said bracing members including a central bracing member 8 which acts in the double capacity of bracing members and means for connecting the runner 9 to the plow.

As shown in Figure 5, the runner 9 is a short runner rounded at the front and provided with one or more metal plates 10 to which a bolt or rod 11 is pivotally connected at 12. The rod 11 extends upwardly through a bar 13 and through the beam 8 so that the spring 14 may be positioned around the end thereof of the nut 15 used for producing proper tension on the spring for holding the runner 9 against the bar 13. The bar 13 is a substantially U-shaped bar preferably with a flat section and with the ends connected by bolts, screws or otherwise to the plow. This construction permits the plow to be supported by the runner 9, while allowing the runner a free swinging movement resisted by the spring 14. Most of the weight of the plow is supported by this runner and the runner moves along on the ground or a lower layer of snow so that it conforms to the nature of the road and, consequently, holds the lower edge of the moldboards 4 and 5 a short distance from the ground. At the rear the frame or bracing bar 7 is formed with a pair of uprights or posts 16 and 17 connected by a transverse bar 18 at the bottom and a transverse bar 19 approximately half way between the bottom and the top. These bars are adapted to receive the central bracing beam 8 and the other parts of the frame 7 so as to present a form of rigid structure for supporting the mold boards 4 and 5. Connected with each of the posts 16 and 17 is a fitting 20 to which the beam 21 is pivotally connected, said beam carrying an auxiliary or wheel plow 22 or rutter as it is sometimes called. This arrangement causes the snow to be cleaned off directly in front of the wheels of the vehicle whereby a good contact with the surface of the road may be secured. Ordinarily, the pivotal connection as just described will be sufficient but if desired, a rope or other means could be connected with the beam 21 so as to raise the rutter 22 if desired, as for instance, when moving rapidly to a place where snow is to be removed.

A pair of braces 23 are connected to the front of the posts 16 and 17 and to the front end of the plow so that whenever the cables 3 are pulled the front of the plow may be tilted upwardly to an inoperative position. In order to accomplish this, the posts or uprights 16 and 17 are pivotally mounted on the cross beam 24 which is rigidly secured to the chassis of the automobile by suitable straps 25. A pin 26 is carried by each end of the bar 24 (Figs. 6 and 7) and said pin accommodates the bifurcated ends 27 of a fitting 28. It will be noted that the bifurcated ends 27 slidably fit against a guiding bracket 29 so that when the respective parts move they are guided. An elevating screw 30 is threaded into each of the fittings 28 and are supported by bracket 31 rigidly secured to the respective uprights 16 and 17. A bevel gear 32 is rigidly secured to each of the elevating screws 30 and mesh with the respective gears 33 carried by the connecting rod 34, which rod is provided with a hand wheel 35. The brackets 31 are carried by the posts 16 and 17 so that when the hand wheel 35 is rotated the posts will be raised or lowered in respect to the bar 24 while at the same time the entire plow is allowed to pivot on the pins 26. By this arrangement, either the rear or the front of the plow may be elevated independently to secure the desired adjustment and the entire plow may be swung upwardly out of the way whenever desired, as for instance, when moving rapidly from one place of operation to another. It will be noted that the plow structure at the front of the vehicle enters and spreads the snow approximately the width of the vehicle but in order to prevent the snow from falling back and also to widen the path, wings 36 and 37 are provided, said wings being arranged preferably on the sides of the vehicle between the front and rear wheels. These wings are identical so that the description of one will apply to both. The wing 37 is provided with a moldboard 38 of the desired curvature and is supplied with suitable bracing bars 39 which are pivotally connected at 40 to suitable brackets 41 whereby hinge structures are produced as shown in Figure 4. The brackets 41 are rigidly secured to a block 42 which block may be wood or any desired material and which is provided with flanges 43 and 44 extending beneath the flange plates 45 and 46 rigidly secured to the guiding frame 47, which frame is secured by U-bolts or otherwise to the chassis of the automobile. Suitable bracing rods 48 are connected to the guiding frame 47 and to the chassis of the automobile so as to take up the strain exerted on the wing. In order to raise and lower the wing 37 to properly co-act with the plow at the front, a threaded bracket 51 is secured to the block 42 and co-acts with the lifting screw 52 rotatably carried by the frame 47 and provided with a hand wheel 53 (Fig. 4). By actuating the hand wheel 53, the wings 37 may be raised or lowered without disturbing the braces 39 or any other part of the device. In order to swing the moldboard inwardly or outwardly on the hinge structure produced by members 40 and 41, a pivotally mounted link 54 is pivotally connected to the moldboard 38 at 55, said link passing loosely through a post 56 carrying a set screw 57. The moldboard is moved pivotally to the desired position and the link 54 slides in post 56. Said screw 57 is then screwed down tight and the link and associated parts are thereby rigidly clamped against further movement.

What we claim is:—

1. In a snow plow adapted to be connected to a motor vehicle, a frame pivotally connected to the forward end of the chassis of said motor vehicle, a pair of moldboards secured in the front of said frame and arranged so that their forward ends come together, a reinforcing beam extending between the forward ends of said moldboards and said frame, a spring actuated bolt passing through said beam adjacent its forward end, said bolt being formed with an eye at its lower end, a runner adapted to engage the ground secured to said bolt through said eye, whereby said runner is permitted to rock on said bolt, and means between said frame and said chassis for vertically adjusting the rear ends of said moldboards.

2. A snow plow comprising a frame pivoted to the forward end of a motor vehicle, a pair of moldboards supported by said frame, a spring actuated runner adjacent the forward end of said moldboard, manually operated elevating means for raising and lowering said frame, and thereby the rear ends of said moldboards, whereby the latter are adjustable to conform to the surface to be cleaned, and means connected to said pivoted frame extending rearwardly thereof for tilting the same, and thereby raise the forward ends of said moldboards.

3. In a snow plow of the character described, a V-shaped plow member adapted to be connected to the front of a vehicle, and a pair of wings or deflecting plow members connected to said vehicle adjacent its rear, each of said wings comprising a moldboard, reinforcing means therefor, means for supporting and mounting each moldboard to the vehicle, said means being hinged to the sides of said vehicle, and connected to the front end of said moldboards, further means connected adjacent the rear ends of the moldboards for optionally adjusting the latter at an angle with respect to the vehicle, and means for raising or lowering the moldboards with respect to the ground.

LUCIUS EDWIN ADAMS.
CHARLES CLYDE PECK.